Dec. 3, 1935.　　　L. J. TETLOW　　　2,022,791
VALVE
Filed Sept. 20, 1929　　2 Sheets-Sheet 1
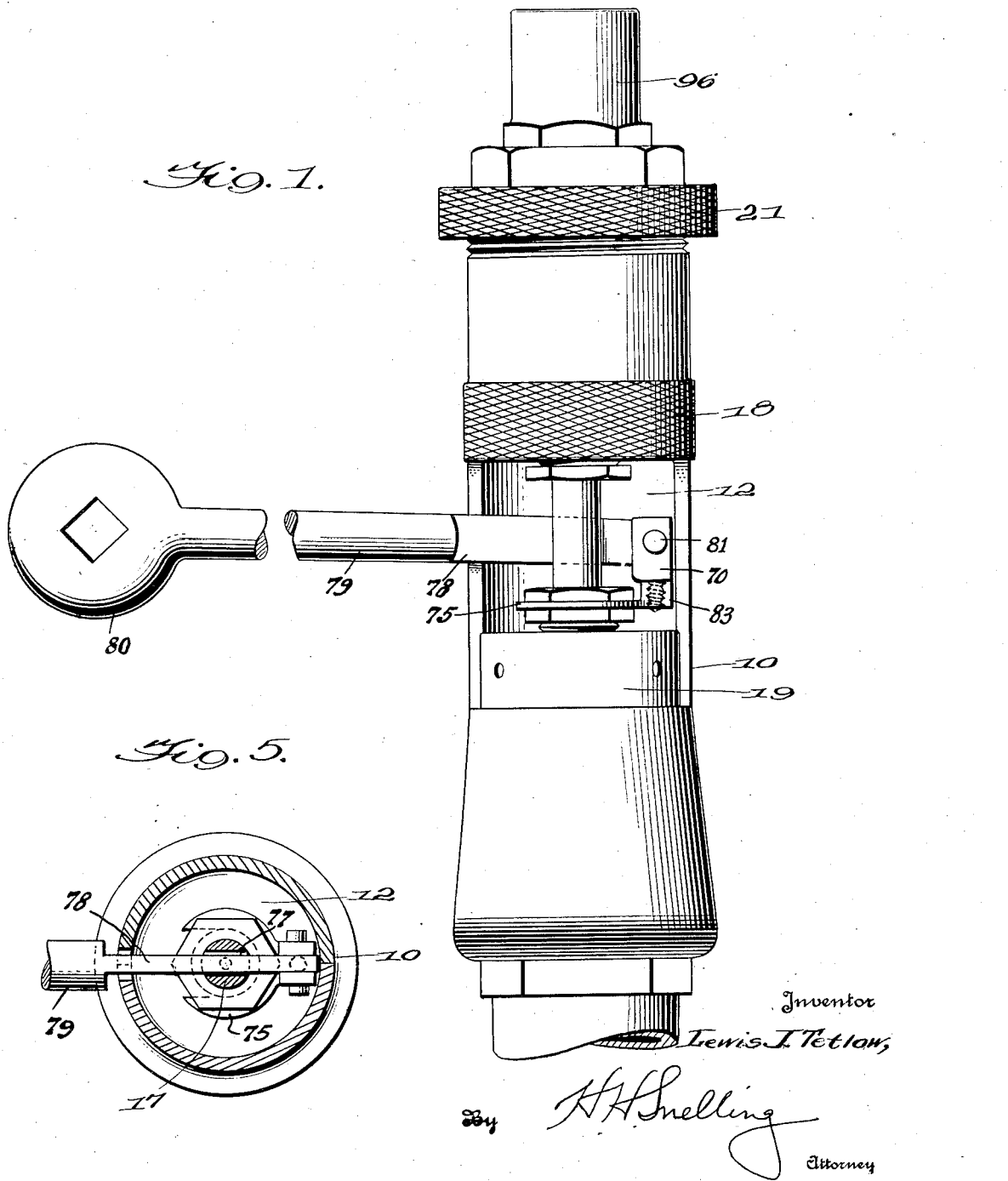

Dec. 3, 1935.  L. J. TETLOW  2,022,791
VALVE
Filed Sept. 20, 1929   2 Sheets-Sheet 2
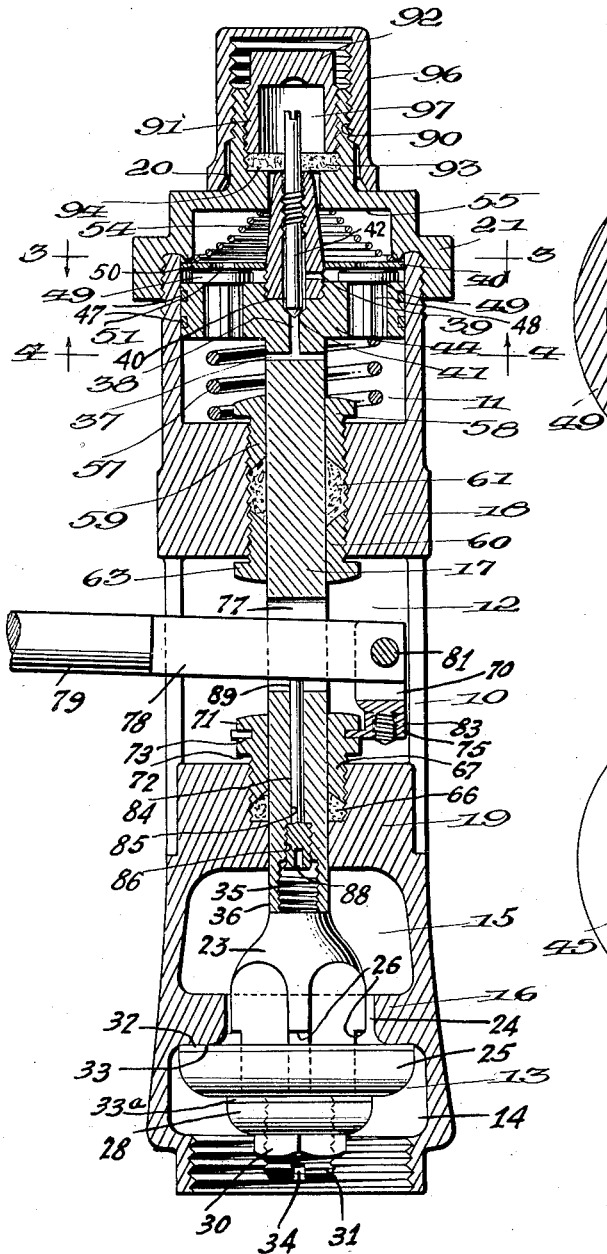
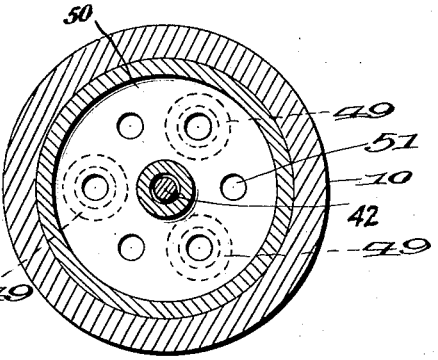
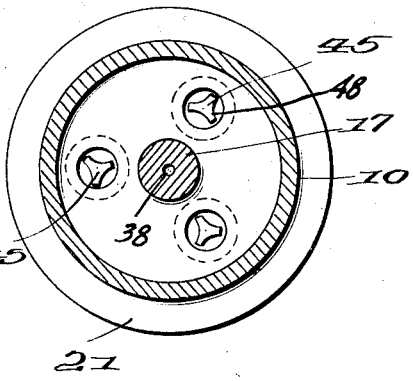
Inventor
Lewis J. Tetlow,
By H. H. Snelling
Attorney Patented Dec. 3, 1935

2,022,791

UNITED STATES PATENT OFFICE 2,022,791

VALVE

Lewis J. Tetlow, Holyoke, Mass.

Application September 20, 1929, Serial No. 394,060

15 Claims. (Cl. 251—133)

This invention relates to fluid control means and has for its principal object the provision of a simple operating valve which is to be opened manually and is retarded in closing by a dashpot, the combination being so arranged as to avoid water hammer action under high pressure.

An object of the invention is the provision of a valve casing so arranged that it can be installed in an awkward position as for example in a corner and after the casing has been installed the handle for operating the valve may be later inserted and can be given any angular positioning most convenient for operation.

A still further object of the invention is the provision of a handle operated valve in which the relation of the handle to the valve may be altered at will. Other objects of the invention relate primarily to details and will be ascertained by reference to the claims.

In a valve of this type it is quite essential to keep the cost as low as possible as competition is keen, yet at the same time it is not possible because of such competition to sacrifice any advantages other competing valves have. The valve of the present invention has therefore been so designed that the labor required to produce the several elements shall be reduced to the lowest possible point and that the labor cost of installation of the finished valve shall likewise be kept lower than usual.

In the drawings:—

Figure 1 is an elevation with the cover plate removed.

Figure 2 is a central vertical section.

Figure 3 is a section on line 3—3 of Figure 2.

Figure 4 is a section on line 4—4 of Figure 2.

Figure 5 is a horizontal section taken thru the central chamber of the valve just above the operating lever.

The casing 10 is made of a single piece divided into an upper dashpot chamber 11, a central chamber 12 and a valve chamber 13, the latter consisting of the inlet space 15 and the outlet space 14 these being separated by the usual partition 16. The valve stem 17 slides thru the rather heavy horizontal wall 18 which separates the dashpot chamber from the central chamber and thru the similar but lower horizontal wall 19 which separates the middle chamber from the outlet chamber and in addition has a bearing in the body 20 of the closure 21 and passes thru gaskets in each of the horizontal walls.

At its lower end the stem 17 is tapped to receive the carrier 23 which is received freely in the central opening 24 in the partition 16. The valve proper 25 is loose on the carrier 23 but is limited in vertical movement by the three shoulders 26 in one direction and by the auxiliary valve 28 which is threaded on the carrier 23 and held in chosen position by a lock nut 30 so that by moving the auxiliary valve on the threaded lower portion 31 of the carrier 23 the amount of play of the valve 25 can be regulated. The upper surface of the valve 25 is plane and on it rests a flat disk 32 which is faced on both sides with a rubber composition material the disk being perforated in a number of places so that in applying the rubber composition it penetrates the holes and makes a much more firm anchoring. The rubber composition is held to the disk 32 in addition by the usual cement. The rubber composition on the top surface of the disk 32 will engage a seat 33 on the bottom face of the partition 16. The auxiliary valve 28 will likewise carry a similar but smaller disk 33ª, the top surface of which engages against the smooth bottom surface of the main valve so that in opening the valve against pressure it is only necessary to release the smaller auxiliary valve, thus relieving the pressure on one side only of the main valve 25 which thereupon may drop by gravity. The kerf 34 in the bottom of the portion 31 is for convenient and positive assembly of the carrier 23 and the valve stem 17, the carrier having a small upper threaded portion 35 fitting within the tapped portion 36 at the bottom of the plunger.

Above the horizontal wall 18 the valve stem 17 has a diametrical bore 37, an axial bore 38 rising centrally from the bore 37 and an inlet passage 39 which is radial, this latter bore 39 opening into a slightly larger axial bore 40 having a conical seat 41 for the needle valve 42 which governs the rate of flow of fluid thru the smaller or restricted bore 38. Between the bores 39 and 37 a piston 44 is secured to the valve stem in some permanent manner preferably by sweating it on. The piston is of sufficient axial depth to receive a plurality of check valves 45 and on its cylindrical periphery carries a plurality of oil grooves 47. Piston oil rings may be carried by these grooves 47 but in practice I prefer not to have them as I can readily make the parts sufficiently accurate to make the expense of the rings unnecessary. Each valve 45 consists in a fluted stem 48 and a head 49, the latter preferably being spherical so that I may rest on the three heads 49 a follower 50 which is merely a disk fitting rather snugly in the dashpot chamber and having a plurality of equispaced openings 51 to pass the oil in both directions. A spiral spring 54 rests upon the disk or follower 50 at or near its periphery and at its apex engages the bottom wall 55 of the closure 21. A heavy spring 57 engages the bottom wall of the piston 44 and the top face of the horizontal wall 18, this spring being held in position by the hexagonal head 58 of a gland 59 cooperating with a similar gland 60 to compress the packing 61 to prevent leakage of fluid from the upper dashpot chamber 11 to the central chamber 12 which may be referred to as the lever chamber. It will be noted that the glands 59 and 60 serve as bushings for the plunger 17 which engages the casing only for a very short distance above the bottom face of the horizontal wall 19.

To prevent leakage of water upward from the water chambers 14 and 15 into the handle chamber 12 I provide packing 66 held in place by a gland 67. In this particular case I might use a second gland similar to 60 but it is very difficult to install such a gland and I find that in practice I can avoid all leakage upwardly of the water by the packing 66 without increasing the friction on the valve stem 17 to an undesired degree. The head of the gland 67 is of special design because I desire to use the head of this gland to position the pivoting stud 70. To this end the upper portion 71 of the head is made hexagonal for adjustment of the gland, the lower portion 72 of the head may be round or hexagonal as desired and between the two portions which together form a spool I provide the annular recess 73 which very snugly receives the flat anchoring portion 75 for the pivot stud 70.

The portion 75 is substantially a disk having a slot opening radially from the center of such width as to receive the diameter of the gland between the portions 71 and 72. There is no tendency for the stud 70 to move in any other direction than up and down and the amount of contact between the anchoring plate 75 and the head portions 71 and 72 is sufficient to prevent any rocking of this member.

The valve stem or plunger 17 is slotted as at 77, this slot receiving the flattened portion 78 of a lever 79 having a handle portion 80. The pivot 81 may be a simple cylinder and with a looseness of fit so that it can very conveniently be withdrawn. To adjust the vertical height of the pivot pin 81 I prefer that the stud 70 shall have a threaded engagement with the standard 83 rising from the anchoring plate 75 for in this way I can adjust the height of the pivot 81 by a simple removal of the anchoring plate 75 which may readily be done. Under other circumstances I prefer to adjust the relationship of the lever 78 to the plunger 17 by use of the stop 84 the upper portion of which is somewhat snugly slidable in a bore 85 opening at its bottom to a larger bore 86 the latter being tapped and opening into the still larger threaded bore 36. The stop member 84 has a kerf as at 88 by means of which it can be adjusted by means of its threaded engagement vertically in the valve stem or plunger 17 so that its upper active portion 89 shall project the desired distance above the bottom of the slot 77. The stop member 84 being coaxial with the plunger is central of the diametric slot 77.

The valve as thus far described is as satisfactory as the usual valves but like them is subject to water hammer action. I avoid this unpleasant occurrence by providing an air cushion chamber in the top of the closure 21, the vertical wall 20 of which is tapped as at 90 to receive a plug 91 having a square head 92 for convenience of assembly. This plug 91 compresses a gasket 93 against a shoulder 94 and drives the packing into firm engagement with the plunger or valve stem 17. A cap 96 has a screw threaded engagement with the outer upper surface of the closure 21 hiding the operating parts and preventing introduction of dirt or grit. In order to make the air cushion effective I operate the valve a few times with the plug 91 a bit loose thus permitting entry of oil into the space 97. When the proper amount of oil has leaked into this space so that the volume of air space remaining is sufficient to cushion the plunger on its upward stroke I bind down the plug by its squared portion 92 and make the seal at the gasket 93 liquid tight. When so adjusted I am unable to get any water hammer action at any pressure that would ever be used on a device of this kind. While my practical tests have only gone to two hundred and twenty-five pounds I believe that the water hammer action will be avoided at pressures greatly in excess of this amount.

What I claim is:

1. In a lever operated valve, a pair of spaced stuffing boxes, a valve stem extending thru said stuffing boxes, a pair of spaced glands in said stuffing boxes for said stem, a lever between the glands for moving the stem, and means carried by one of the glands for pivoting the lever.

2. A valve operating mechanism comprising a casing, a reciprocating plunger in said casing, said plunger revolvable in said casing, a valve and valve seat, lever operating means for said valve, and means within said plunger for altering the point of contact between the lever and plunger.

3. A valve operating mechanism comprising a casing, a freely rotatable plunger mounted within said casing for reciprocating movement therein, a valve carried by said plunger, and means carried by the plunger for regulating the limit of movement of said valve and means for adjusting said valve.

4. A valve operating mechanism comprising a casing having inlet and outlet ports, a valve and valve seat, an enclosed chamber above said valve and seat, a plunger in said casing, means on said plunger for supporting said valve, means carried by said plunger for unseating and seating said valve, and means in said plunger for regulating the point of contact between the lever and plunger.

5. A valve operating mechanism comprising a casing, partitions in said casing for enclosing the operating mechanism from a valve and valve seat, a plunger extending thru said partition for supporting a valve carrier and valve, means above said partition for operating said plunger, and means carried by said plunger accessible from beneath said partition for regulating the point of contact between the operating means and plunger.

6. A valve operating mechanism comprising a casing having a plurality of compartments, a plunger extending thru said compartments, a valve and valve seat in the lower compartment, means for securing said valve to said plunger, means in another compartment for operating said plunger, and means accessible from the lower compartment for adjusting the point of contact between the operating means and plunger.

7. A valve operating mechanism comprising a casing, a plunger movable in said casing, a valve and valve seat, means secured to the plunger for loosely supporting said valve, a slot in said plunger, an operating lever passing thru said slot, means for pivotally mounting said lever in said casing, and means carried by the plunger for regulating the point of contact between the lever and plunger.

8. In a valve, a stem having a slot, a lever projecting thru the slot, a pivot for the lever, means carried by the stem for altering the point of contact between the lever and stem, and means for moving the pivot parallel to the axis of the stem.

9. In a valve, a stem having a slot, a lever projecting thru the slot, a pivot for the lever, means carried by the stem for altering the point of contact between the lever and stem, said means being rotatable with respect to and coaxial with the stem axis.

10. In a valve, a stem having a slot, a lever projecting thru the slot, a pivot for the lever, means carried by the stem for altering the point of contact between the lever and stem, said means having screw threaded engagement with the stem, and additional means for adjusting the height of said pivot.

11. In a valve, a stem having a slot, a lever projecting thru the slot, a pivot for the lever, and means for supporting the pivot, said supporting means being adjustable in a direction parallel to the axis of the stem and also angularly movable about the stem axis.

12. In a valve, a stem having a slot, a lever projecting thru the slot, a pivot for the lever, and means for supporting the pivot, said supporting means being adjustable in a path parallel to the axis of the stem.

13. In a valve, a stem having a slot, a lever projecting thru the slot, a pivot for the lever, and adjustable pivot supporting means for changing the location of the pivot with respect to the slot and angularly about the stem axis.

14. In a dash pot controlled valve, a casing, a partition in the casing, a plunger extending thru the partition, a pair of opposed glands forming bushings for the plunger, packing between the glands, and a third bushing gland surrounding the plunger, a lever for operating the plunger, an adjustable pivot loosely clasping said third gland, said lever being connected to turn on said pivot.

15. The device of claim 14 in which the lever pivot support is located between two of the glands and is easily removable for convenient manipulation of one of the glands.

LEWIS J. TETLOW.